United States Patent Office 3,092,654
Patented June 4, 1963

3,092,654
PREPARATION OF DICARBOXYLIC ACID NITRILES
Ralph Courtenay Schreyer, Wilmington, Del., assignor to E. I. du Pont de Nemours and Company, Wilmington, Del., a corporation of Delaware
No Drawing. Filed June 17, 1960, Ser. No. 36,702
3 Claims. (Cl. 260—465.8)

This invention relates to a process for the preparation of dicarboxylic acid nitriles from cyclic nitriles and more particularly relates to the preparation of adiponitrile by the hydrogenolysis of 1,2-dicyanocylobutane. This application is a continuation-in-part of U.S. Serial No. 847,070, filed October 19, 1959, and now abandoned.

In accord with the prior art, adipontrile has been prepared by a number of involved processes, as described in the disclosure of D. J. Loder et al. U.S. Patent 2,369,061, by passing a stream of ammonia through a liquid monoalkyl adipate half ester; of D. J. Loder U.S. Patent 2,377,795, by reacting a dicarboxylic acid with a nitrile of an organic acid; of H. B. Copelin et al. U.S. Patent 2,783,268, by contacting 1,4-dichlorobutane with sodium cyanide; and of J. M. Estes, Jr., U.S. Patent 2,878,277, by a modification of the Copelin et al. process ibid. and equivalent processes in which prescribed amounts of hydrogen cyanide are used. The instant invention relates to a new and improved process for preparing this dinitrile by a process involving hydrogenolysis in which the 1,2-carbon-carbon bond of a 1,2-dicyanocyclobutane is broken and the carbon atoms saturated with hydrogen.

Objects of the invention are to provide processes for the preparation of nitriles of dicarboxylic acids; the hydrogenolysis of dicyanocyclobutane; the preparation of adipic acid nitrile; the vapor phase conversion of 1,2-dicyanocyclobutane and its isomers to adiponitrile and the treatment of 1,2-dicyanocyclobutane with hydrogen and a catalyst without substantially any hydrogenation of the CN group to amines.

The above and other objects of the invention are conducted in accord with the invention by the hydrogenolysis of a dicyanocycloalkane and more especially 1,2-dicyanocyclobutane in the form of either the cis or trans isomer or a mixture of both, to a linear acyclic dinitrile, the reaction being conducted in the vapor phase in the presence of hydrogen and a suitable catalyst for the hydrogenolysis. The contact time in the catalyst zone is, for optimum yields, from about 1 to about 20 seconds at temperatures between 150 and 450° C. and preferably between 175 and 400° C. when the reaction is conducted at about one atmosphere pressure. Pressures below or above atmospheric pressure may be used, if desired, ranging down to 100 mm. of Hg and up to 1,000 p.s.i.g. or higher.

The compound, 1,2-dicyanocyclobutane, the preferred reactant, contains two geometric isomers, one a solid, M.P. 37–38° C., the trans isomer, B.P.₆ 123° C.; the other, a solid, M.P. 72–73° C., the cis isomer B.P.₆ 165° C. The process of the invention may be carried out with either solid isomer or a mixture of them.

The 1,2-dicyanocyclobutane is preferably vaporized and passed with hydrogen into a zone in which a catalyst for the reaction is disposed. Hydrogenation catalysts generally effective for the reaction are especially copper, nickel and cobalt chromite catalysts; nickel and cobalt hydrogenation catalysts; and precious metal catalysts, such as rhodium and palladium. The ratio of hydrogen to the dicyanocyclobutane can vary through wide limits; the use of hydrogen to the extent of at least 20% excess on a mol basis over that necessary to react stoichiometrically with the substituted cyclobutane and to saturate the carbon-carbon bond split by the hydrogenolysis, is recommended. However, the acyclic dinitrile is also produced with less than stoichiometrical amounts of hydrogen.

The table which follows illustrates, by way of examples, embodiments of the invention. The processes from which these data were taken were conducted by passing 2 ml. (ca. 2 g.) of vaporized 1,2-dicyanocyclobutane in 2–4 minutes over the catalysts which were maintained at the temperatures shown. The condensed products were analyzed by gas chromatography.

Table

| Ex. | Catalyst | Sec. Contact Time | Temp., °C. | Conv. of Dimer | Percent Yield of ADN | Conv. to ADN |
|---|---|---|---|---|---|---|
| 1 | A | 1–1.5 | 325 | 21 | 27 | 6 |
| 2 | A | 1–1.5 | 298 | 21 | 48 | 10 |
| 3 | B | 6–8 | 228–257 | 42 | 63 | 27 |
| 4 | B | 6–8 pure cis isomer. | 213–248 | 90 (50% went to trans isomer). | 49 | 21 |
| 5 | C | 1–1.5 | 286–341 | 11 | 66 | 7 |
| 6 | D | 1–1.5 | 324–328 | 11 | 61 | 7 |
| 7 | E | 1–1.5 | 290–316 | 6 | 26 | 2 |
| 8 | F | 1–1.5 | 275–286 | 17 | 13 | 2 |
| 9 | B | 6–8 | 222–246 | 35 | 67 | 24 |
| 10 | G | 4 | 226–279 | 30 | 80 | 24 |

A = Ber., 68 761–765 (1935) Rh on Al₂O₃.
B = reduced cobalt oxide.
C = nickel chromite.
D = cobalt molybdate.
E = J. Phys. Chem. 35,1684 (1931), nickel on alumina.
F = 0.1% platinum + 0.9% copper on Al₂O₃.
G = reduced nickel oxide.

A possible reaction mechanism may be the splitting of the ring of the 1,2-dicyanocyclobutane to the diradical,

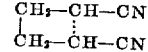

and then hydrogenating the diradical to adiponitrile in the presence of a hydrogenation catalyst. The diradical, in the absence of hydrogen and a hydrogenation catalyst, continues to decompose into two molecules of acrylonitrile.

The reaction may, if desired, be carried out by way of a batch, as distinguished from a continuous process. Batch operation is conducted by charging an autoclave with the dicyanocyloalkane and the catalyst, replacing the air with hydrogen and after closing the autoclave, raising the temperature of the autoclave and contents to the reaction temperature. Repressuring with hydrogen will replace the consumed hydrogen when the original charge of hydrogen is insufficient to supply the necessary amount.

Many changes may be made in the conditions used for effecting the hydrogenolysis of the reactant other than those disclosed, which are capable of converting the cyclic dinitrile to an acyclic dinitrile without departing from the invention as covered by the appended claims.

I claim:
1. A process for the production of adiponitrile which comprises contacting 1,2-dicyanocyclobutane in the vapor phase, with hydrogen, and a hydrogenation catalyst selected from the group consisting of copper chromite, nickel chromite, cobalt chromite, cobalt molybdate, reduced nickel oxide, reduced cobalt oxide, rhodium, palladium, rhodium on aluminum oxide, nickel on alumina, and platinum and copper on aluminum oxide, at a temperature between 150° C. and 450° C. and at a pressure between 100 mm. of Hg and 1000 p.s.i.g. for between about 1 and about 20 seconds.

2. A process for the production of adiponitrile which comprises reacting 1,2-dicyanocyclobutane in the vapor phase in the presence of hydrogen and a hydrogenation catalyst selected from the group consisting of copper chromite, nickel chromite, cobalt chromite, cobalt molybdate, reduced nickel oxide, reduced cobalt oxide, rhodium, palladium, rhodium on aluminum oxide, nickel on alumina, and platinum and copper on aluminum oxide, for a time of 1–20 seconds, at a temperature of 150–450° C. at a pressure of 100 mm. of Hg to 1000 p.s.i.g., said hydrogen being present to the extent of at least 20% excess on a mol basis over that necessary to react stoichiometrically with 1,2-dicyanocyclobutane.

3. The process according to claim 2 in which the temperature is between 175 and 400° C. and the pressure is one atmosphere.

References Cited in the file of this patent

UNITED STATES PATENTS

| | | |
|---|---|---|
| 2,532,311 | Howk et al. | Dec. 5, 1950 |
| 2,532,312 | Romilly | Dec. 5, 1950 |
| 2,749,359 | Calkins et al. | June 5, 1956 |
| 2,867,628 | Cass | Jan. 6, 1959 |
| 2,999,107 | Lindsey et al. | Sept. 5, 1961 |

UNITED STATES PATENT OFFICE
CERTIFICATE OF CORRECTION

Patent No. 3,092,654                          June 4, 1963

Ralph Courtenay Schreyer

It is hereby certified that error appears in the above numbered patent requiring correction and that the said Letters Patent should read as corrected below.

Column 2, in the table, fourth column, line 5 thereof, for "286-341" read -- 282-341 --.

Signed and sealed this 10th day of December 1963.

(SEAL)
Attest:
ERNEST W. SWIDER

Attesting Officer

EDWIN L. REYNOLDS

Acting Commissioner of Patents